(12) United States Patent
Brennan (10) Patent No.: US 10,014,820 B2
(45) Date of Patent: Jul. 3, 2018

(54) SOLAR PANEL SELF-STORING ADJUSTABLE ANGLE MOUNT (71) Applicant: Thomas J Brennan, Parker, TX (US)

(72) Inventor: Thomas J Brennan, Parker, TX (US)

(*) Notice: Subject to any disclaimer, the term of this patent is extended or adjusted under 35 U.S.C. 154(b) by 0 days.

(21) Appl. No.: 15/468,612

(22) Filed: Mar. 24, 2017

(65) Prior Publication Data
US 2017/0288603 A1 Oct. 5, 2017

Related U.S. Application Data (60) Provisional application No. 62/317,139, filed on Apr. 1, 2016.

(51) Int. Cl.
H02S 20/30 (2014.01)
F24J 2/52 (2006.01)

(52) U.S. Cl.
CPC ............ *H02S 20/30* (2014.12); *F24J 2/52* (2013.01)

(58) Field of Classification Search
CPC ........................................ H02S 20/30
USPC ........................................... 136/245
See application file for complete search history.

(56) References Cited

U.S. PATENT DOCUMENTS

| 2006/0225781 A1* | 10/2006 | Locher | H01L 31/02 |
| | | | 136/245 |
| 2015/0115869 A1* | 4/2015 | Edmunds | F24J 2/523 |
| | | | 320/101 |
| 2017/0040932 A1* | 2/2017 | Lillywhite | H02S 20/30 |

OTHER PUBLICATIONS

Swan, Portable Solar Charger for Backpacking by Iwerka: 13W Dual Port Water-resistant Portable Solar Mobile Charger, pp. 1-6, Jan. 27, 2016 (http://bestportablesolargenerators.com/portable-solar-charger-for-backpaking-by-iwerkz, downloaded Sep. 27, 2017).*
Lillywhite et al., U.S. Appl. No. 62/275,000, filed Jan. 5, 2016.*

* cited by examiner

*Primary Examiner* — Jayne L Mershon (57) ABSTRACT

This invention provides solar applications with a strong, light, universal solar panel mount that pivots inside the solar panel frame for compact storage or transport with no disassembly. It also pivots out at adjustable angles to work with any latitude or season without assembly. The mount is adjustable to a wide range of solar panel angles to allow the solar panel to best match the sun angle for multiple latitudes and seasons of the year. It can be temporarily free standing or permanently placed via the use of the attachment points.

4 Claims, 9 Drawing Sheets

SOLAR PANEL SELF-STORING ADJUSTABLE ANGLE MOUNT

CROSS-REFERENCE TO RELATED APPLICATIONS

This application claims the benefit of U.S. Provisional Patent Application No. 62/317,139, filled Apr. 1, 2016.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND

There are a wide variety of solar panel mounting systems and devices available. One problem with existing mounting systems is that they either require permanently attaching the solar panels to a structure or are bulky and not conducive to convenient storage and transportation of the panels to which they are attached. This means that consumers and installers are required to uninstall the mounting systems before the panels can be transported or stored in a volumetrically efficient manner. Another problem with existing solar panel mounting systems is that they are not adjustable in angle to allow for changing optimal sun angles based on different latitudes and the time of year. Therefore, what is needed is a self-storing adjustable angle mount for solar panels that allows the panels to be easily stored and transported with the mounts installed and allow for the angle of the panels to be easily adjusted to optimum sun angles based on different latitudes and the time of year.

SUMMARY

In one aspect, the invention acts as a stand for a solar panel that is attached to the panel at two points. These attachment points consist of pivot point hinges capable of rotating relative to the plane of attachment. The "U" shaped stand that is connected to these hinges has a width that is less than the width of the solar panel frame to allow for the stand to store in a position within the panel. The stand is also connected to the panel via two flexible straps. These straps are comprised of two separate pieces of flexible material that are joined by an adjustable ladder lock. The straps are connected to the stand via two rivets and are connected to the panel by two more rivets. The straps are threaded through web strapping ladder locks to keep tension on the straps and to hold the stand in place. The stand is adjustable to allow for the solar panel to be angled to match the sun for different latitudes and times of year.

In another aspect, the invention provides four loops made from flexible material so that they can be used to stake or tie down the panels for wind resistance and stability. There are two of these loops connected to the "U" shaped stand via rivets and two loops connected to the solar panel frame via rivets.

DETAILED DESCRIPTION

The invention can be more readily understood through reference to the following detailed description in conjunction with the accompanying figures, which are part of this disclosure. It is important to be understood that this invention is not limited to the specific device, design, and method described, and that the description used herein is used for the purpose of example and is not intended to limit the claims of the invention.

The pivot point 12 for the mount is placed about ⅓ down from the top of the solar panel frame 2. One side of the adjustable angle strap 7 is fastened via rivet 5 to the tubular mount 3 approximately ¾ down from pivot point 12. The other side of the adjustable angle strap 7 goes to a ladder lock 6, giving it adjustable length & allowing tubular mount 3 to pivot. The ladder lock 6 is attached to the solar panel frame 2 about ⅔ down from the top. The tie down loops 4 are placed at the bottom of the solar panel frame 2 and bottom of the tubular "U like" mount 3.

When the solar panel is stored vertical or horizontal, the Self-Storing Adjustable Angle Mount fits inside the solar panel frame already mounted permanently. Adjustable angle straps 7 fall to the side. When the solar panel is in use, the mount 3 swings out and rests on the ground. The adjustable angle straps 7 are pulled tight to the best angle for maximum solar panel power production for that season and latitude.

Figure 1:
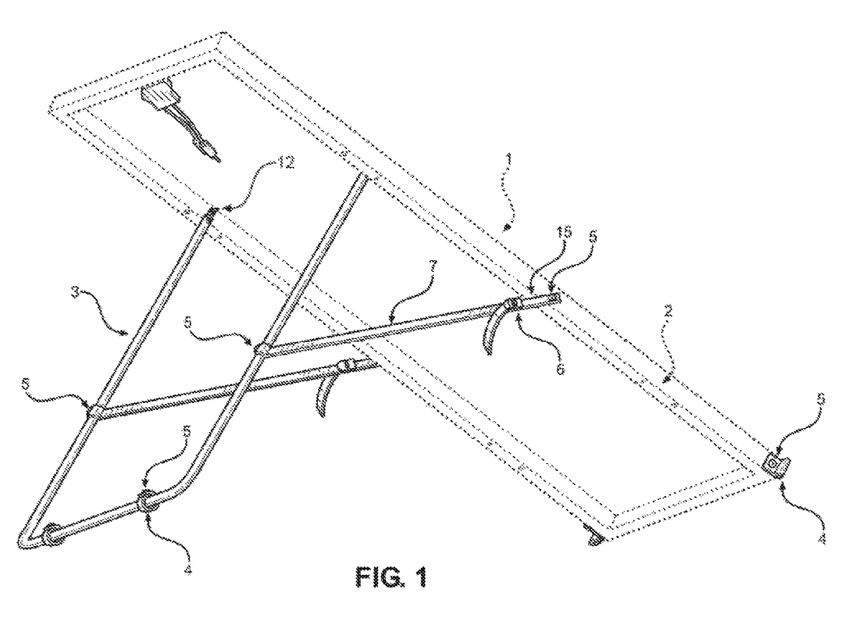
FIG. 1 is a first perspective view of a Solar Panel with "Self-Storing Adjustable Angle Mount"
Figure 2:
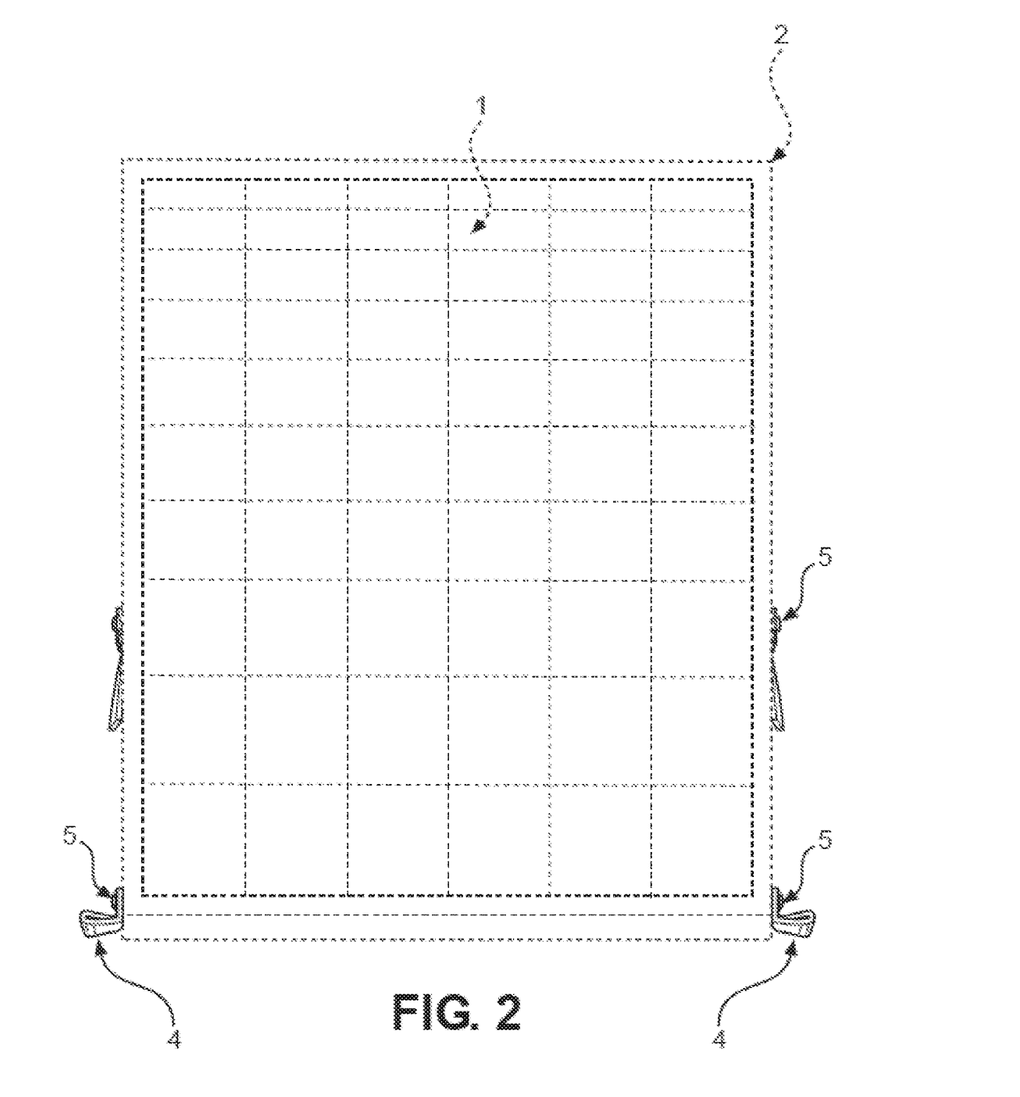
FIG. 2 is a front view of a solar panel with "Self-Storing Adjustable Angle Mount" pivot point assembly.
Figure 3:
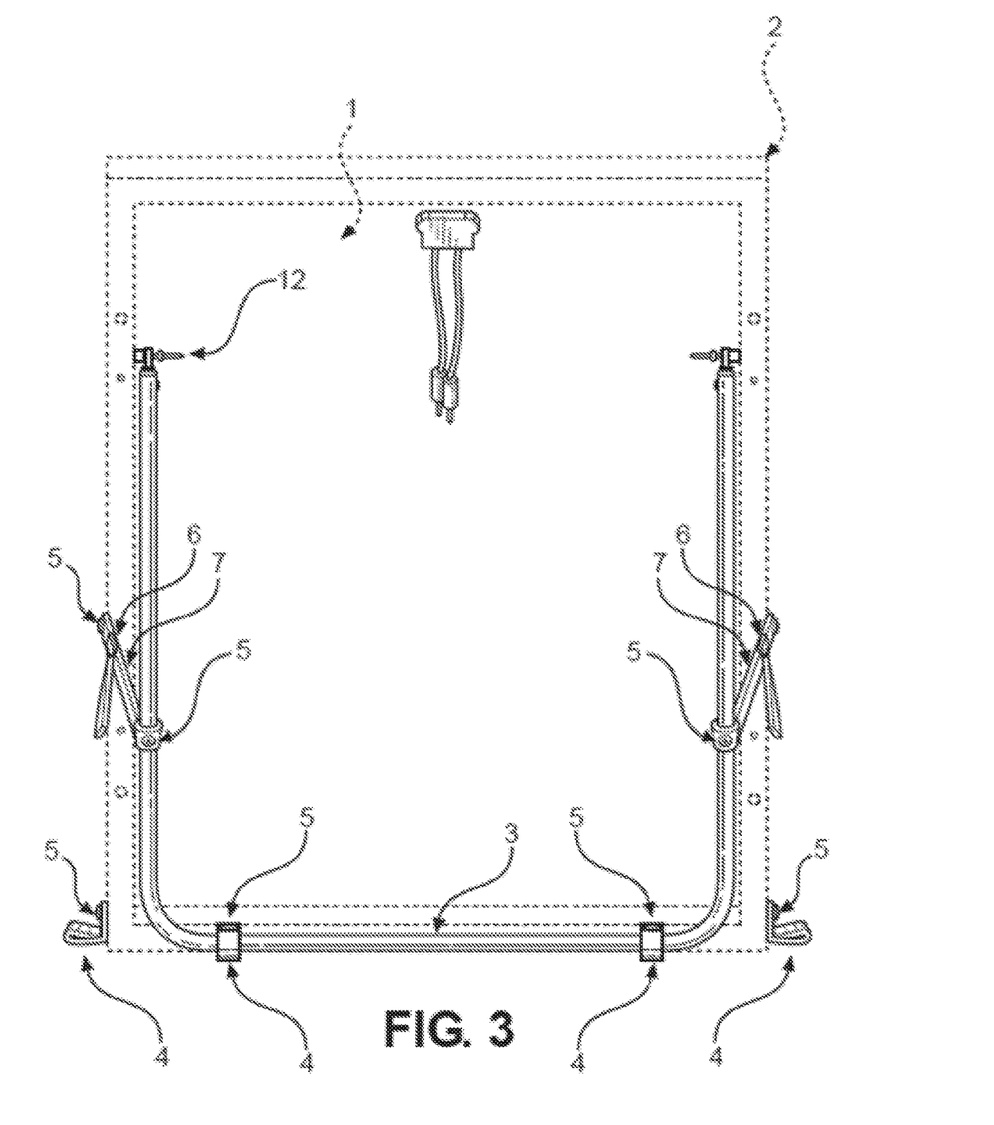
FIG. 3 is a back view of a solar panel with "Self-Storing Adjustable Angle Mount" pivot point assembly.
Figure 4:
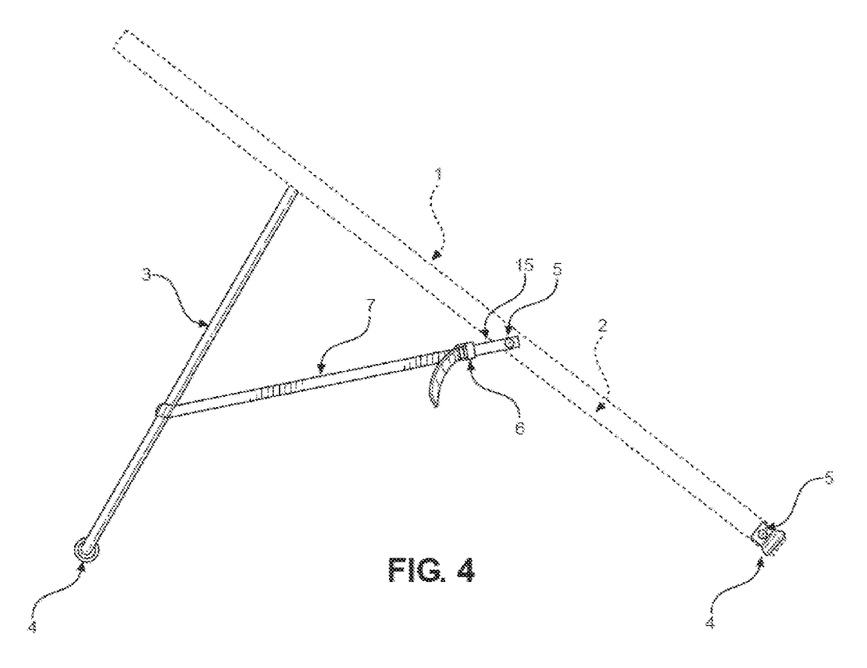
FIG. 4 is a side view of a solar panel with "Self-Storing Adjustable Angle Mount" shown at a medium angle example.
Figure 5:
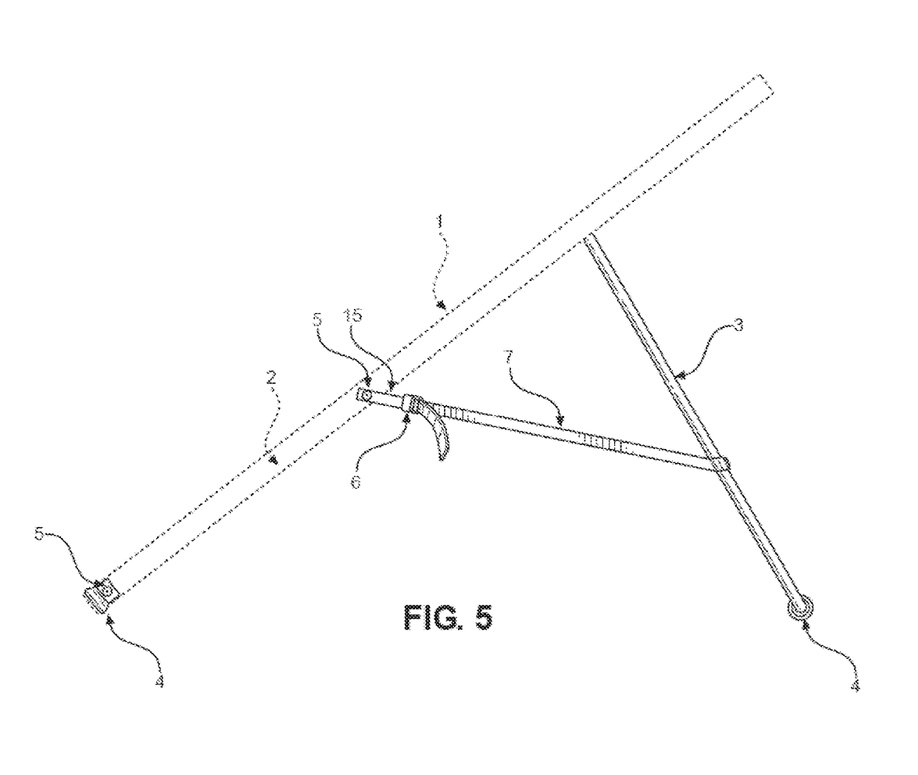
FIG. 5 is another side view of a solar panel with "Self-Storing Adjustable Angle Mount" shown at a medium angle example.
Figure 6:
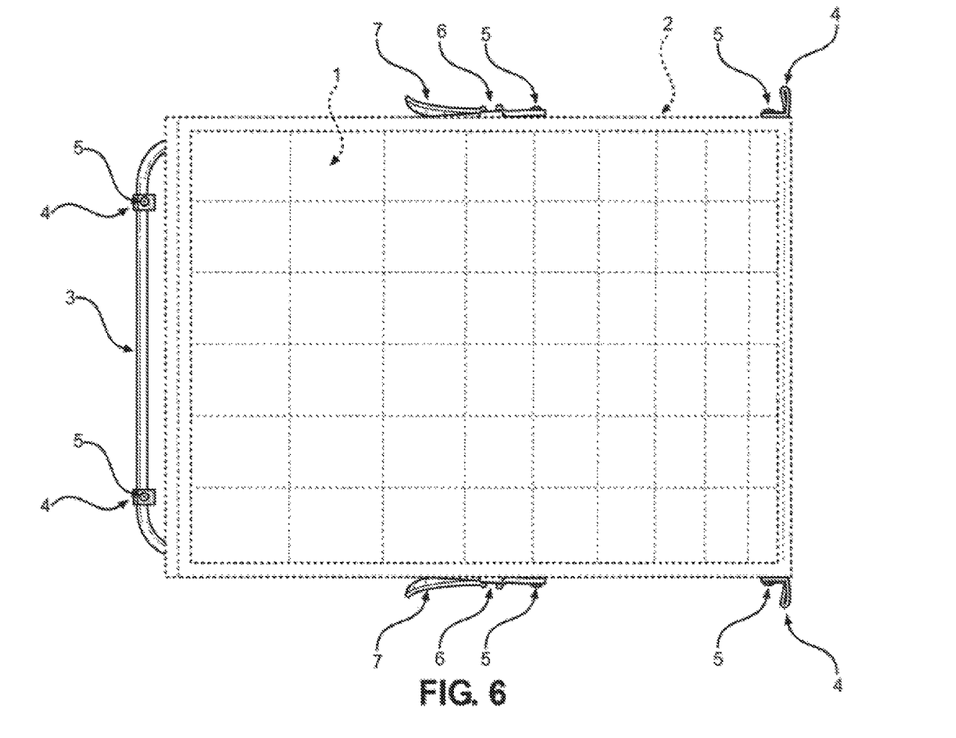
FIG. 6 is a top view of a solar panel with "Self-Storing Adjustable Angle Mount" shown at a medium angle example.
Figure 7:
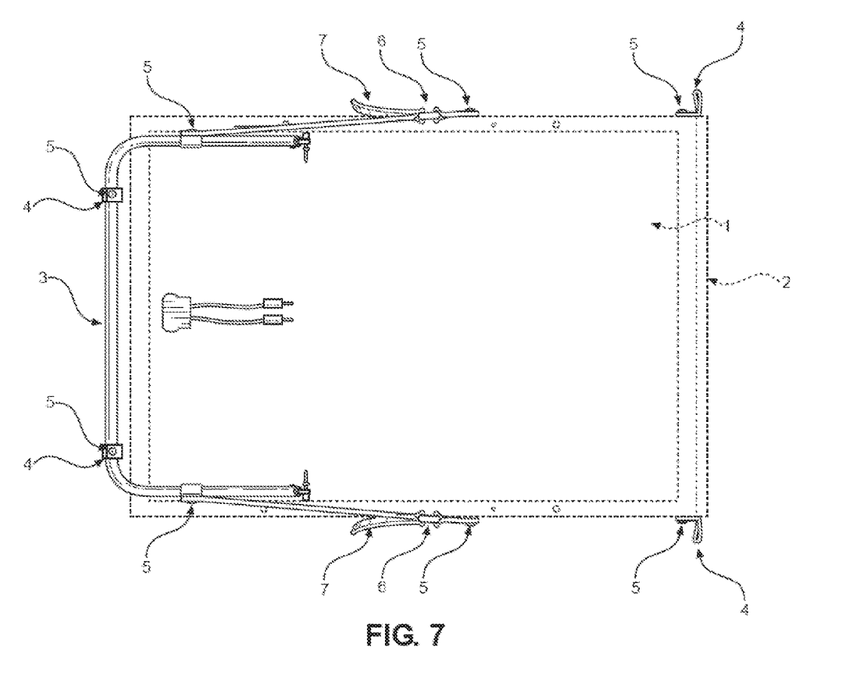
FIG. 7 is a bottom view of a solar panel with "Self-Storing Adjustable Angle Mount" shown at a medium angle example.

The adjustable angle straps 7 allow either a short, medium, or long distance between the bottom of the tubular mount 3 and the solar panel frame 2. This changing distance allows the solar panel angle to change. Tie downs are used if the tubular mount 3 is completely vertical=maximum panel angle to face the sun in winter or northern latitudes. See FIG. 1.

The Adjustable angle mount stores inside the solar panel frame. When using the solar panel, the mount pivots out underneath the panel providing two wide points of contact with the ground. To maximize solar panel power production, the angle of the panel needs to be as close as possible to perpendicular to the sun. An adjustable angle allows changing of angle several times during the year for more power production vs. fixed angle mounts.

The mounting of a single solar panel comes built into the solar panel structure and does not require assembly or disassembly to use. This design allows for the lightest and smallest solar mounting with significant strength & wind loads. The mount fits completely inside of the frame. Adjustable angle straps are used to support the mount in optimum solar panel power production angles. The mount and solar panel are self-supporting. Permanent placement of the mounted panels is possible via usage of the tie down loops to restrain the panel mount to a surface.

Figure 8:
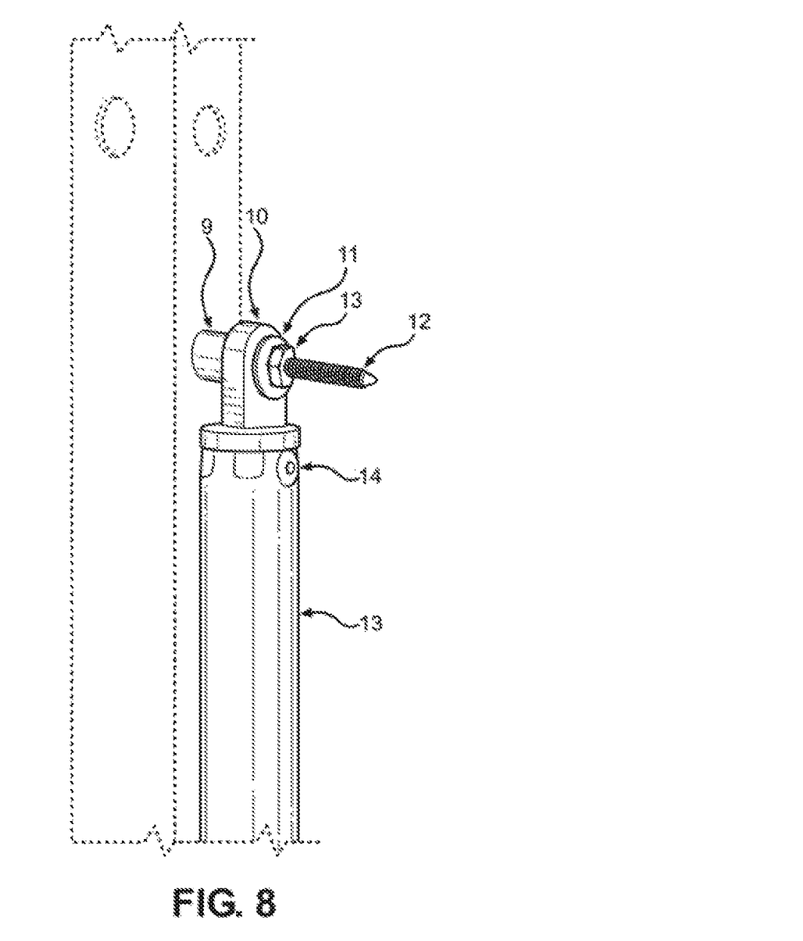
FIG. 8 is a close up view of the pivot point assembly.
Figure 9:
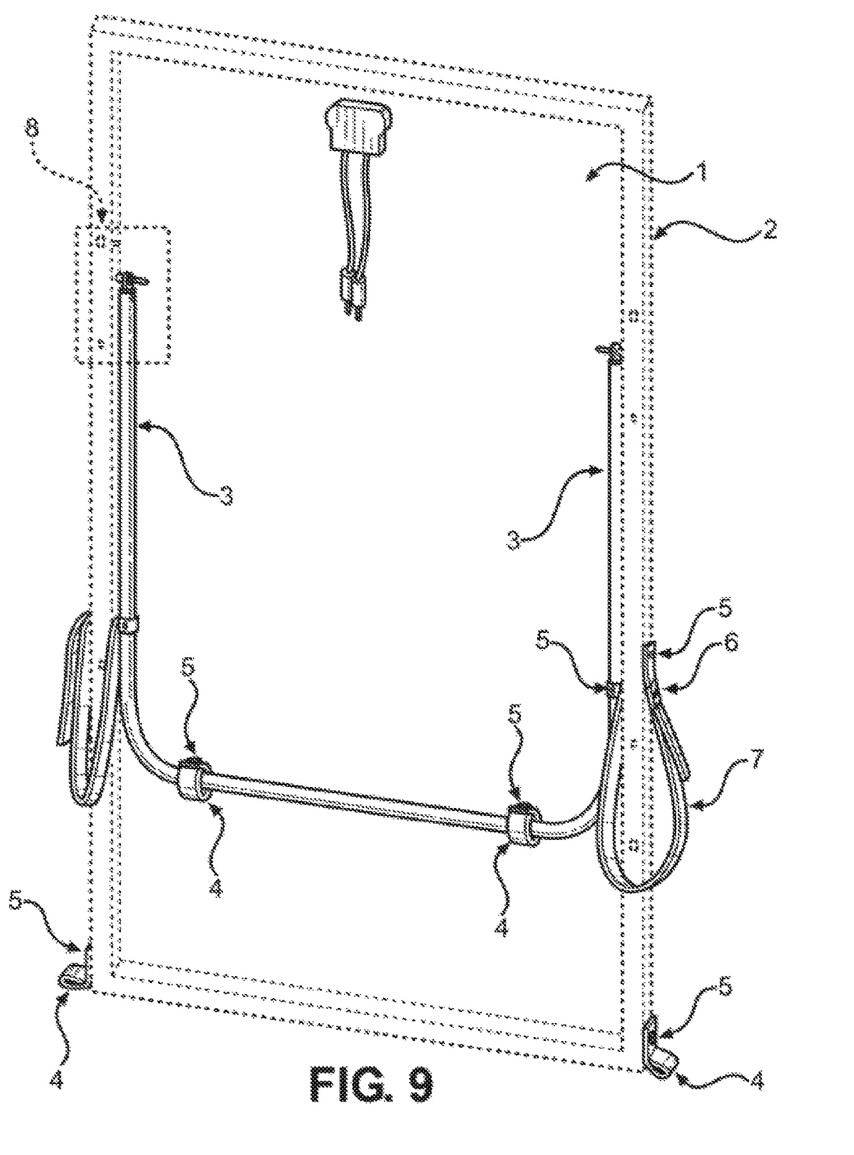
FIG. 9 is another perspective of the solar panel with "Self-Storing Adjustable Angle Mount" in the stored position.

To construct the support structure, a pipe bender bends tubular steel into a "U-like" shape 3. The pipe ends are cut off to allow for a proper length/height for the mount in North America. Holes are drilled into tubular mount 3 and solar panel frame 2 to allow rivets 5 for tie down loops 4, adjustable angle straps 7, and loop for ladder lock 15. A hole is also drilled for pivot point bolt 12. Tube end internal eye 12 is inserted into tubular mount 3 and secured to each other via rivet 14. Tie down loops 4, straps 7, web strapping ladder locks 6 and 15 are attached with rivets 5. Pivot point assembly 8 is assembled. The pivot point bolt 12 is then pushed through the hole that was drilled through the solar panel frame 2. Then a spacer 9 is slid over the pivot bolt 12 followed by the tube end internal eye 10, and a washer 11, and then the whole assembly is secured via tightening a nut 13. Adjustable angle straps 7 are inserted into ladder locks 6. Entire Adjustable Angle Mount self-stores inside solar panel frame.

The invention claimed is:
1. A self-storing adjustable angle mount, comprising:
a tubular support structure for pre-market or post-market solar panels having two ends, each of which are configured to be interconnected with a pre-market or post-market solar panel frame via a pivot point connector;
wherein said ends of the tubular support structure are secured to each pivot point connector by a nut and bolt;
at least one flexible strap having a first and second length of material, wherein said straps are configured to interconnect the tubular support structure with a pre-market or post-market solar panel frame;
a ladder lock;
wherein the first and second length of material of the strap are interconnected by the ladder lock.
2. The mount as defined in claim 1, wherein the pivot points allow for rotational movement of the tubular support structure within a pre-market or post-market solar panel frame.
3. The mount as defined in claim 1, wherein the flexible straps have a first and a second end; the first end is riveted to a pre-market or post-market solar panel frame and the second end is riveted to the tubular support structure.
4. The mount as defined in claim 1, wherein the length of the flexible strap is adjustable via threading the second length of flexible material through the ladder lock.

* * * * *